United States Patent
NA et al.

(10) Patent No.: US 8,090,423 B2
(45) Date of Patent: Jan. 3, 2012

(54) MOBILE TERMINAL

(75) Inventors: Young Soo NA, Seoul (KR); Chang Il Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 487 days.

(21) Appl. No.: 12/409,206

(22) Filed: Mar. 23, 2009

(65) Prior Publication Data

US 2010/0137042 A1 Jun. 3, 2010

(30) Foreign Application Priority Data

Nov. 28, 2008 (KR) .................. 10-2008-0119542

(51) Int. Cl.
*H04M 1/00* (2006.01)
(52) U.S. Cl. ..................................... 455/575.5; 455/117
(58) Field of Classification Search .................. 455/117, 455/550.1, 575.1, 575.5, 575.7, 575.8
See application file for complete search history.

(56) References Cited

U.S. PATENT DOCUMENTS

| | | | | |
|---|---|---|---|---|
| 7,389,129 | B2 * | 6/2008 | Shoji | 455/575.5 |
| 2009/0093286 | A1 * | 4/2009 | Zhu et al. | 455/575.5 |
| 2010/0113111 | A1 * | 5/2010 | Wong et al. | 455/575.5 |
| 2010/0234081 | A1 * | 9/2010 | Wong et al. | 455/575.5 |

FOREIGN PATENT DOCUMENTS

| | | |
|---|---|---|
| CA | 2633391 A1 | 9/2008 |
| WO | WO 2005/004277 A1 | 1/2005 |
| WO | WO 2009/033616 A1 | 3/2009 |

* cited by examiner

*Primary Examiner* — Don Le
(74) *Attorney, Agent, or Firm* — Birch, Stewart, Kolasch & Birch, LLP

(57) ABSTRACT

A mobile terminal comprises a front case and a rear case which are fastened with a printed circuit board (PCB) and an antenna connected with the PCB interposed therebetween; a battery protection cover opening and closing a battery receiving space provided on the rear case; and a conductive coupling element formed on one of the rear case and the battery protection cover such that the conductive coupling element is overlapped with at least one of one edge and the other edge of the antenna.

20 Claims, 9 Drawing Sheets

FIG.7C $$a + b = \lambda/4$$

MOBILE TERMINAL

This nonprovisional application claims priority under 35 U.S.C. §119(a) on Patent Application No. 10-2008-0119542 filed in Republic of Korea on Nov. 28, 2008 the entire contents of which are hereby incorporated by reference.

BACKGROUND

1. Field

This document relates to a mobile terminal having an antenna and a printed circuit board (PCB).

2. Related Art

A mobile terminal is a compact and light wireless communication terminal device that can be carried around and has one or more functions such as voice/video call communication function, information input/output function, data storage function, or the like. The mobile wireless communication terminal further includes supplementary functions supporting capturing of images or video, playing music or video files, playing games, receiving broadcasts, or the like, so as to be advanced as a composite multimedia player.

Mobile terminals perform radio communications by using a printed circuit board (PCB) with various circuits mounted thereon and an antenna that radiates electromagnetic waves upon receiving power from the PCB. A user makes or receives a call by closely putting a mobile terminal to his ear, so he cannot avoid the influence of electromagnetic waves from the PCB and the antenna of the mobile terminal. Thus, bases or references for minimizing the electromagnetic waves of the mobile terminal affecting the user, for example, hearing aid compatibility (HAC), a specific absorption rate (SAR), or the like, are forcibly standardized. Therefore, a method that may satisfy the references of the wireless mobile communication sectors such as the HAC/SAR or the like by reducing electromagnetic waves that affect the human bodies is urgently required.

SUMMARY

An aspect of this document is to provide a mobile terminal capable of minimizing electromagnetic waves that make a bad influence on the human body and satisfying standards such as hearing aid compatibility (HAC), a specific absorption rate (SAR), or the like, regarding controlling of electromagnetic waves.

In one aspect, a mobile terminal comprises a front case and a rear case which are fastened with a printed circuit board (PCB) and an antenna connected with the PCB interposed therebetween; a battery protection cover opening and closing a battery receiving space provided on the rear case; and a conductive coupling element formed on one of the rear case and the battery protection cover such that the conductive coupling element is overlapped with at least one of one edge and the other edge of the antenna In another aspect, a mobile terminal comprises a first printed circuit board (PCB) installed in a first body; a second PCB connected with the first PCB via a flexible PCB (FPCB), and connected with an antenna, wherein the second PCB is installed in a second body; a battery protection cover opening and closing a battery receiving space provided on a rear case of the second body; and a conductive coupling element formed on one of the rear case and the battery protection cover such that the conductive coupling element is overlapped with at least one of one edge and the other edge of the antenna.

BRIEF DESCRIPTION OF THE DRAWINGS

The implementation of this document will be described in detail with reference to the following drawings in which like numerals refer to like elements.

DETAILED DESCRIPTION

The foregoing and other objects, features, aspects and advantages of the present invention will become more apparent from the following detailed description of the present invention when taken in conjunction with the accompanying drawings. Throughout the specification, the same reference numerals may be used for the elements. In describing the present invention, if a detailed explanation for a related known function or construction is considered to unnecessarily divert the gist of the present invention, such explanation has been omitted but would be understood by those skilled in the art.

The mobile terminal according to exemplary embodiments of the present disclosure will now be described in detail with reference to the accompanying drawings. In the following description, usage of suffixes such as 'module', 'part' or 'unit' used for referring to elements is given or mixedly used merely to facilitate explanation of the present disclosure, without having any discriminated meaning or role by themselves.

The mobile terminal explained in this specification may include mobile phones, smart phones, notebook computers, digital broadcast terminals, personal digital assistants (PDAs), portable multimedia players (PMPs), navigation terminals, and the like.

The mobile terminal according to the present disclosure will now be described in detail with reference to the accompanying drawings.

Figure 1:
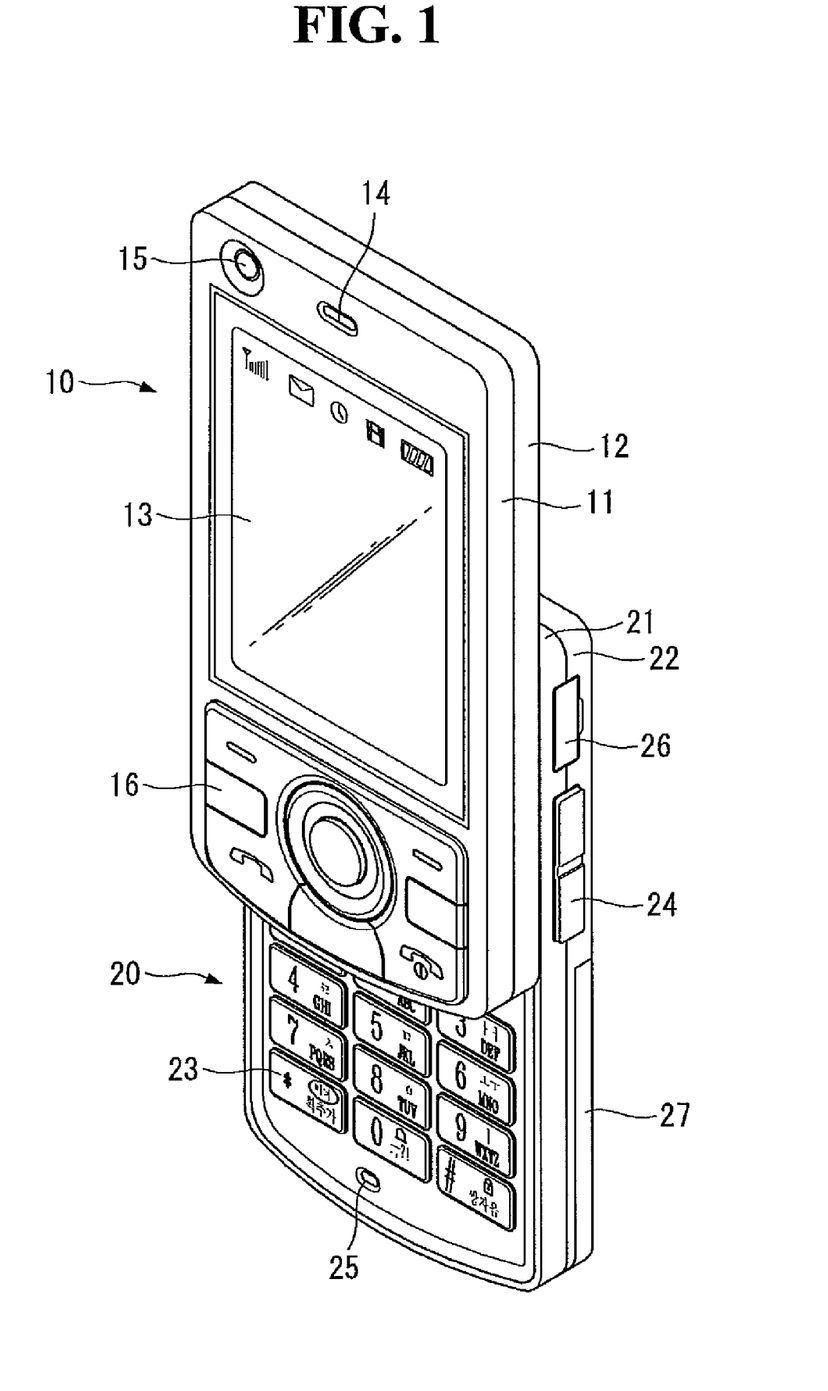
FIG. 1 is a front perspective view of a mobile terminal according to an embodiment of the present disclosure.
Figure 2:
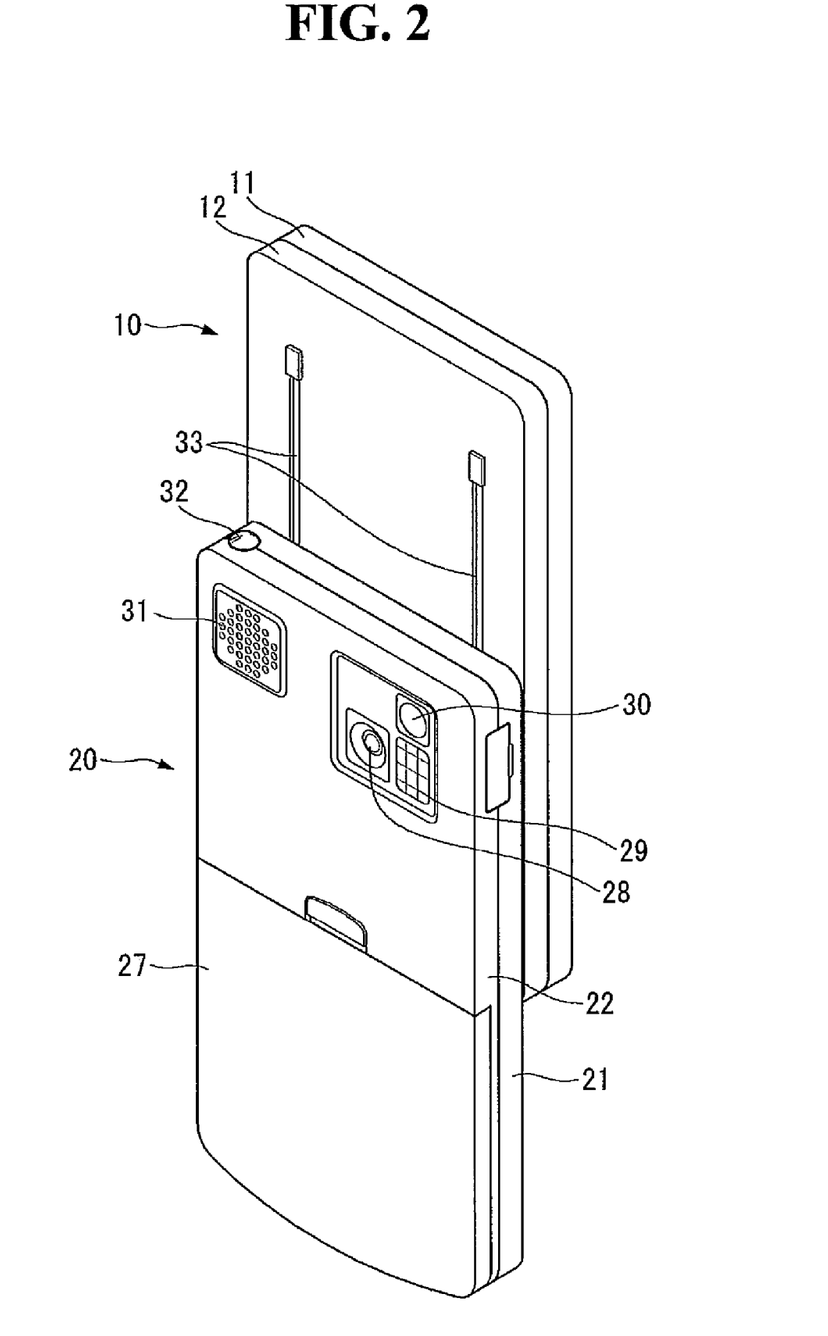
FIG. 2 is a rear perspective view of the mobile terminal shown in FIG. 1.

With reference to FIGS. 1 and 2, the mobile terminal according to an embodiment of the present disclosure includes a first body 10 fastened to a second body 20 such that the first body 10 can be slidably movable.

In the below description, a state in which the first body 10 is disposed to overlap with the second body 20 is defined as a closed configuration (or retracted position), and as shown in FIGS. 1 and 2, a state in which the first body 20 has been slidably moved from the second body 20 so at least a portion of the second body 20 is exposed is defined as an open configuration (or extended use position). In the closed configuration, the mobile terminal mainly operates in a standby mode (idle mode), and the standby mode may be released according to a user manipulation. The mobile terminal operates mainly in a call mode or the like in the open configuration, and it can be changed to the standby mode according to a user manipulation or with the lapse of a certain time.

The case (a casing, a housing, a cover, or the like) constituting the external appearance of the first body 10 includes a front case 11 and a rear case 12. A slide printed circuit board (PCB) is installed in a space formed between the front case 11 and the rear case 12. One or more intermediate cases may be additionally disposed between the front case 11 and the rear case 12. The cases may be formed by injection-molding a synthetic resin or may be made of a metallic material such as stainless steel (STS) or titanium (Ti), etc.

A display unit 13, a first audio output unit 14, a first image input unit 15, a first manipulation unit 16, or the like, may be located on the front case 11. The display unit 13 may include a liquid crystal display (LCD), an organic light emitting diode (OLED) module, and the like, that visually displays information. The display unit 13 may be combined with a touch sensor, a proximity sensor, or the like, so as to be configured as a touch screen that detects a touch input or a proximity input, and in this case, the display unit 13 also serves as an input device for receiving user information as well as serving as an output device for outputting video signals. The audio output unit 14 includes a receiver or a speaker and outputs audio signals. The first image input unit 15 includes a camera module for capturing a photo image (image) or video in front of the mobile terminal. The first manipulation unit 16 includes one or more of a keypad, a dome switch, a touch pad, a jog wheel, a jog switch, a track ball, and a joy stick, and receives a user instruction or user data for controlling the operation of the mobile terminal.

A main PCB to which an antenna is connected is installed between the front case 21 and the rear case 22 of the second body 20. A slide PCB installed in the first body 10 and the main PCB installed in the second body 20 are electrically connected via a flexible printed circuit board (FPCB). The FPCB may include a flexible wire (FW), a flexible circuitry (FC), or the like.

A second manipulation unit 23 may be disposed on a front surface of the front case 21. The second manipulation unit 23 may include one or more of the keypad, the dome switch, the touch pad, the jog wheel, the jog switch, the track ball, and the joy stick.

A third manipulation unit 24, an audio input unit 25, and an interface 26 may be displayed on at least one of the front case 21 and the rear case 22. The first to third manipulation units 16, 23, and 24 may be collectively called a manipulating portion, and any method can be employed for the manipulating portion so long as it can be operated by the user in a tactile manner. For example, the manipulating portion may be implemented as a dome switch, a touch screen, or a touch pad that can receive an instruction or information according to user's pushing or touching, or may be implemented in the form of a wheel that rotates a key, a jog element, the joystick, or the like.

The user may input instructions such as starting, ending, scrolling, or the like, via the first manipulating unit 16, and input numbers, characters, symbols, or the like, via the second manipulating unit 23. The third manipulating unit 24 may be operated as a hot key for performing a special function such as activation of the first image input unit or the like.

The audio input unit 25 may be implemented in the form of, for example, a microphone in order to receive the user's voice or other sounds.

The interface 26 provides an interface communication path allowing the mobile terminal according to the present disclosure to exchange data with an external device. For example, the interface 26 may include at least one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, and the like. The interface 26 may include a card socket for accommodating an identification module or a detachable external card including an external memory. The identification module is a chip that stores various information for authenticating the authority of using the mobile terminal, and includes a subscriber identity module (SIM), a universal subscriber identity module (USIM), and the like.

A power supply unit 27 is mounted on the rear case 22 to supply power to the mobile terminal. The power supply unit 27 includes a rechargeable battery, a battery protection cover, or the like. The battery is connected to a power input terminal of the main PCB that penetrates the rear case 22. A coupling element is formed at an external case of the power supply unit 27 or the rear case 22 such that it partially overlaps with the antenna. The coupling element forms coupling with the antenna to serve to distribute current flowing across the main PCB, the FPCB, and the slide PCB to thereby weaken the current flowing toward an upper end of the first body 10, namely, toward the first audio output unit 14. The coupling element will be described in detail with reference to FIGS. 4A to 9 later.

A second image input unit 28 may be additionally mounted on a rear surface of the rear case 22 of the second body 20. The second image input unit 28 has a rear image capture direction which is substantially the opposite to that of the first image input unit (15 in FIG. 1). The second image input unit 28 may include a camera supporting a different number of pixels as that of the first image input unit 15. For example, the first image input unit 15 may be a camera operating with a relatively lower resolution to capture the user face and transmit the same to another party during video call communication or the like, while the second image input unit 28 may a camera operating with a relatively higher resolution to capture a general subject with high picture quality and not immediately transmit the same.

A flash 29 and a mirror unit 30 may be additionally disposed on the rear surface of the rear case 22. When an image of the subject is captured with the second image input unit 28, the flash 29 illuminates the subject. The mirror unit 30 allows the user to see himself when he wants to capture his own image (self-image capturing) by using the second image input unit 28.

A second audio output unit 31 may be additionally disposed on the rear case 22. The second audio output unit 31 may implement a stereophonic function in conjunction with the first audio output unit (14 in FIG. 1) and may be also used for call communication in a speaker phone mode.

A broadcast signal receiving antenna 32 may be disposed at one side of the rear case 22, in addition to an antenna that supports call communications. The broadcast signal receiving antenna 32 can be configured to be retractable from the second body 20.

One part of a slide module 33 that slidably combines the first body 10 and the second body 20 may be disposed on the rear case 12 of the first body 10. The other part of the slide module 33 may be disposed on the front case 21 of the second body 20.

In the above description, the second image input unit 28 and so on is disposed on the second body 20, but such configuration is not meant to be limited. For example, one or more of the elements (e.g., 28 to 32) such as the second image input unit 28 and so on, which are disposed on the rear case 22 in the above description, may be mounted on the first body 10. In the mobile terminal, the second image input unit 28 may be omitted and the first image input unit 15 may be configured to rotate to thus allow image capturing in various directions including the image capture direction of the second image input unit 28.

In the present disclosure, the slide type mobile terminal is shown as an example in FIGS. 1 and 2. The present disclosure may be also applicable for the mobile terminal having the first body 10 and the second body 20 which are combined such that they are relatively movable, such as the slide type mobile terminal, a folder type mobile terminal, a swing type mobile terminal, and the like. Also, it should be understood that the present disclosure may be applicable for any types of mobile terminals.

Figure 3:
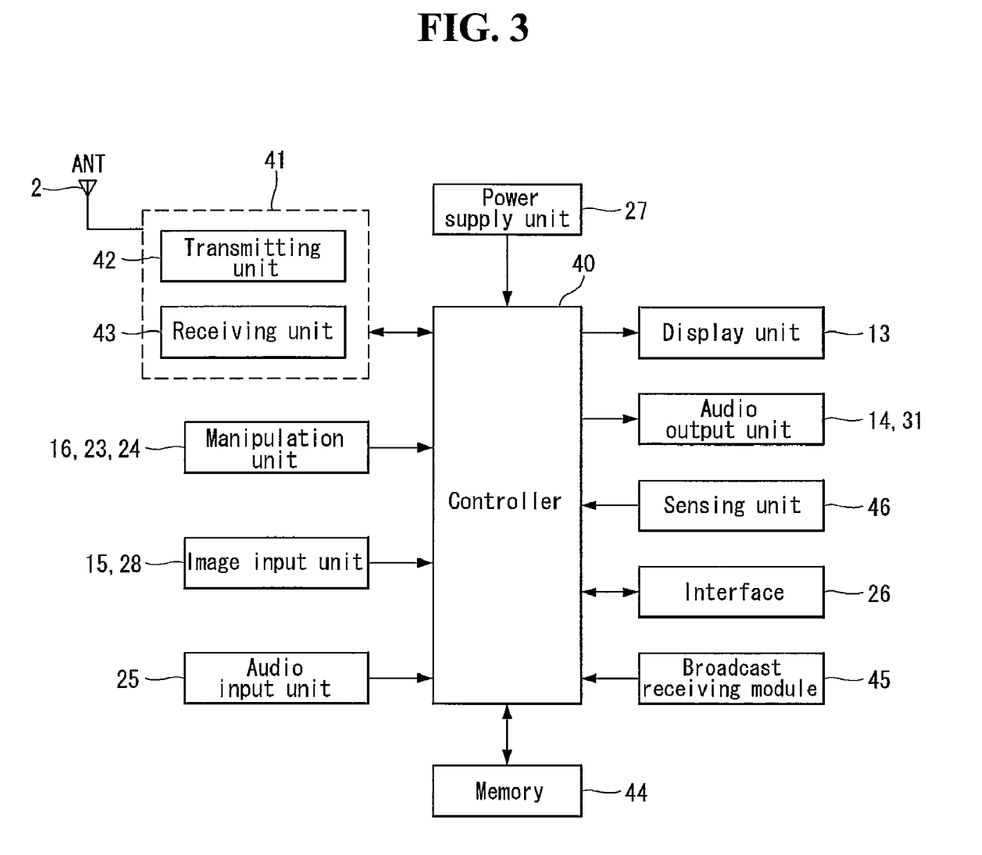
FIG. 3 is a block diagram showing the mobile terminal as shown in FIG. 1 in detail.
Figure 4A:
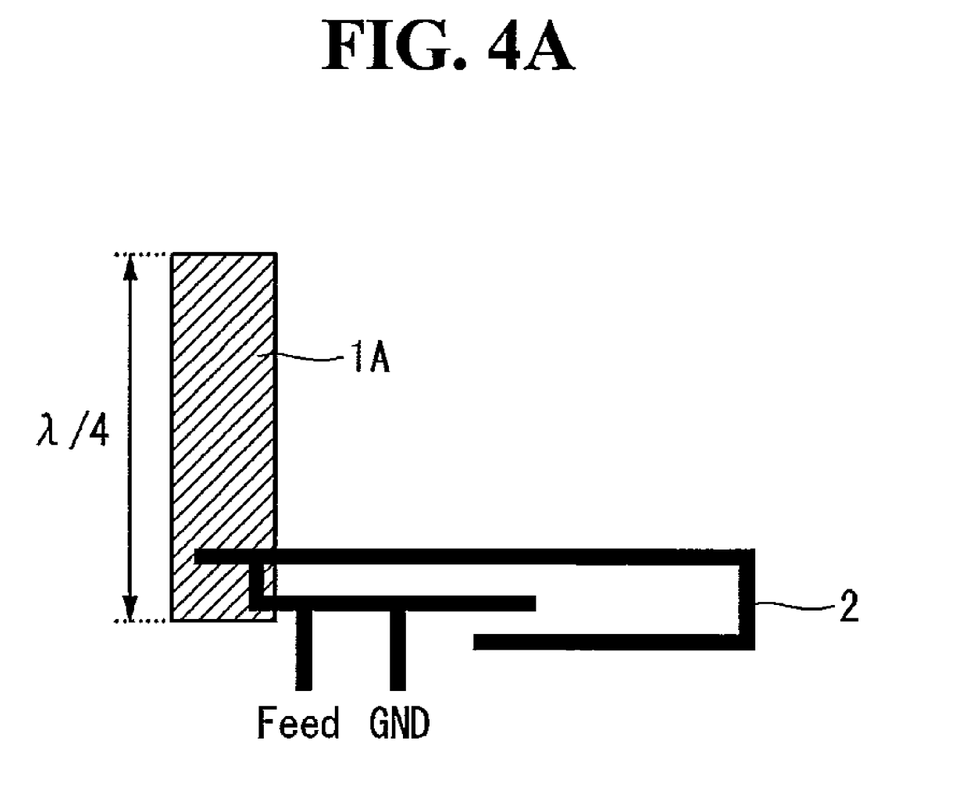
FIGS. 4A and 4B are plan views showing a coupling element and an antenna according to an embodiment of the present disclosure.
Figure 4B:
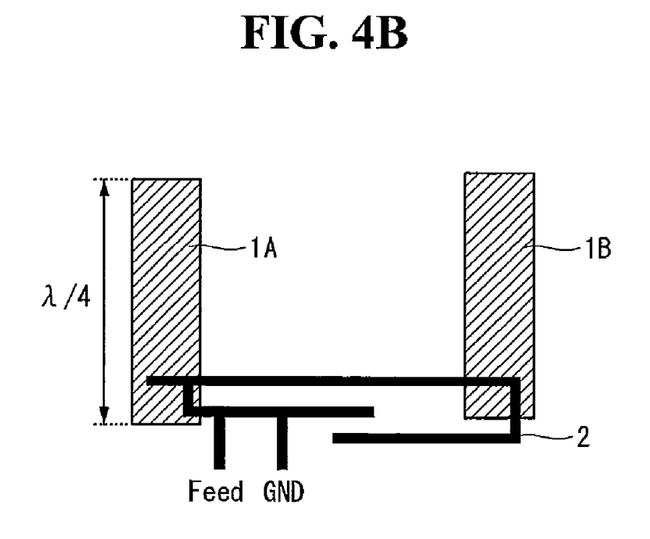

FIG. 3 is a block diagram illustrating the configuration of the mobile terminal in detail according to an embodiment of the present disclosure.

As shown in FIG. 3, the mobile terminal includes a mobile communication module 41, the manipulation units 16, 23, and 24, the image input units 15 and 28, the audio input unit 25, the display unit 13, the audio output units 14 and 31, a sensing unit 46, the interface 26, a broadcast receiving module 45, a memory 44, the power supply unit 27, and a controller 40.

The controller 40 typically controls the general operations of the mobile terminal. For example, the controller 40 performs controlling and processing associated with every function that can be executed in the mobile terminal, such as voice calls, data communications, video calls, image transmission/reception, e-mail transmission/reception, photo image/video capturing, voice recording, and the like.

The mobile communication module 41 transmits/receives radio signals to/from a mobile communication base station via the antenna 2. For example, the mobile communication module 41 handles transmission/reception of voice data, text data, image data, and control data under the control of the controller 40, and may include a transmitting unit 42 that modulates a signal to be transmitted and transmits the modulated signal and a receiving unit 43 that demodulates a received signal. The mobile communication module 41 may include a short-range communication module.

The manipulation units 16, 23, and 24 may include one or more of a keypad, the dome switch, the touch pad, the jog wheel, the jog switch, the track ball, and the joy stick, and receive a user construction and user data and supply the same to the controller 40.

The image input units 15 and 28 process image frames such as a still image, video, or the like, obtained by an image sensor in a video call mode or an image capture mode. The image data processed by the image input units 15 and 28 are converted into image data that can be displayed on the display unit 13 via the controller 40, and then outputted to the display unit 13. The image frame processed by the image input units 15 and 28 may be stored in the memory 44 or transmitted to the exterior via the mobile communication module 41 under the control of the controller 40.

The audio input unit 25 receives an external audio signal via the microphone in a phone call mode, recording mode or a voice recognition mode and processes it into electrical voice data. The voice data processed by the audio input unit 25 is converted into a format transmittable to a mobile communication base station via the mobile communication module 41 in case of the phone call mode, and then outputted to the mobile communication module 41. When the mobile terminal is operated in the recording mode, the voice data processed by the audio input unit 25 is stored in the memory 44. The audio input unit 25 may include various types of noise canceling algorithms to cancel noise or interference generated in the course of receiving external audio signals.

The display unit 13 displays video information processed in the mobile terminal. For example, the display unit 13 may display a user interface (UI) or a graphic user interface (GUI) associated with call communications under the control of the controller 40 or display photo image/video according to a user input.

The audio output units 14 and 31 output audio data received from the mobile communication module 41 or audio data stored in the memory 44 in a call signal reception mode, the phone call mode, the recording mode, the voice recognition mode, a broadcast receiving mode, or the like, under the control of the controller 40. The audio output units 14 and 31 output audio signals associated with various events, for example, a call signal reception sound, a message reception sound, or the like, performed in the mobile terminal. To this end, the audio output units 14 and 31 include a speaker, a receiver, a buzzer, or the like.

The sensing unit 46 detects a current status of the mobile terminal such as an open/close state of the mobile terminal, a location of the mobile terminal, presence or absence of user contact with the mobile terminal, etc., and generates a sensing signal for controlling the operation of the mobile terminal. The sensing unit 46 may include sensors for detecting whether or not the power supply unit 27 supplies power or whether or not the interface 26 is coupled with an external device, or the like. In addition, the sensing unit 46 may include a touch sensor or a proximity sensor for recognizing a touch input or a proximity input by the user, or a gyro sensor or a terrestrial magnetic sensor for recognizing a change in the angle of the mobile terminal, a movement of the mobile terminal, acceleration of the mobile terminal, or the like.

The interface 26 serves as an interface with every external device connected with the mobile terminal, and the external devices may include wired/wireless headsets, external power chargers, wired/wireless data ports, identification module card sockets, external memory card sockets, or the like. The interface 26 may be used to receive data or power from an external device and transfer the received inputs to each element within the mobile terminal or transfer data from the mobile terminal to an external device.

The memory 44 may store software programs used for the processing and controlling performed by the controller 180, or may store a phonebook, messages, images, video, or the like. The memory 44 may include at least one type of storage medium including a flash memory type, a hard disk type, a multimedia card micro type, a card-type memory (e.g., SD or DX memory, etc), a random access memory (RAM), a read-only memory (ROM), an electrically erasable programmable read-only memory (EEPROM), programmable read-only memory (PROM), a magnetic memory, a magnetic disk, and an optical disk.

The broadcast receiving module 45 receives a broadcast signal transmitted via a satellite channel or a terrestrial channel, converts the received signal into a format of broadcast data that can be outputted to the display unit 13, and then outputs the converted data to the controller 40. In addition, the broadcast receiving module 45 receives supplementary data (e.g., electric program guide (EPG)) associated with broadcasts. The broadcast data converted by the broadcast receiving module 45 and the supplementary data may be stored in the memory 44.

The power supply unit 27 generates power required by the various components of the mobile terminal, upon receiving external power or internal power under the control of the controller 40.

The driving circuit such as the display unit 13, the audio output units 14 and 31, the first image input unit 15, or the like, are mounted on the slide PCB installed in the first body 10 and connected with the first manipulation unit 16. The circuits such as the mobile communication module 41 connected with the antenna 2, the image input unit 28, the sensing unit 46, the interface 26, the broadcast receiving module 45, the memory, the power supply unit 27, the controller 40, and the like, are mounted on the main PCB installed in the second body 20 and connected with the audio input unit 25 and the manipulation units 23 and 24.

FIGS. 4A to 6 are drawing illustrating coupling elements 1A and 1B of the mobile terminal according to an embodiment of the present disclosure.

With reference to FIGS. 4A to 6, the mobile terminal includes one or more coupling elements 1A and 1B disposed to overlap with one edge of the antenna 2 or overlap with one edge and the other edge of the antenna 2.

Figure 5:
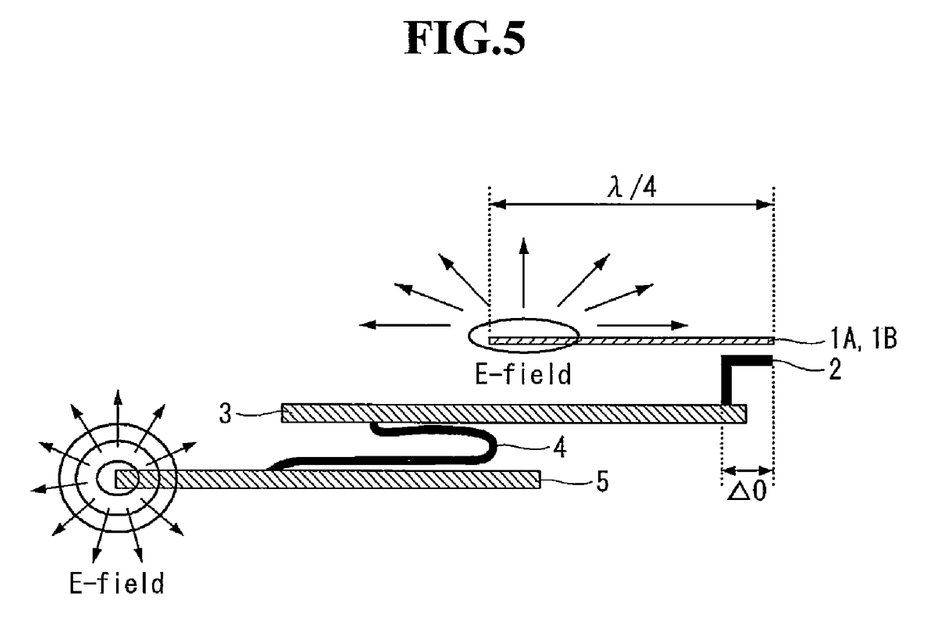
FIG. 5 is a vertical sectional view showing a coupling element and an antenna of a slide type mobile terminal according to an embodiment of the present disclosure.
Figure 6:
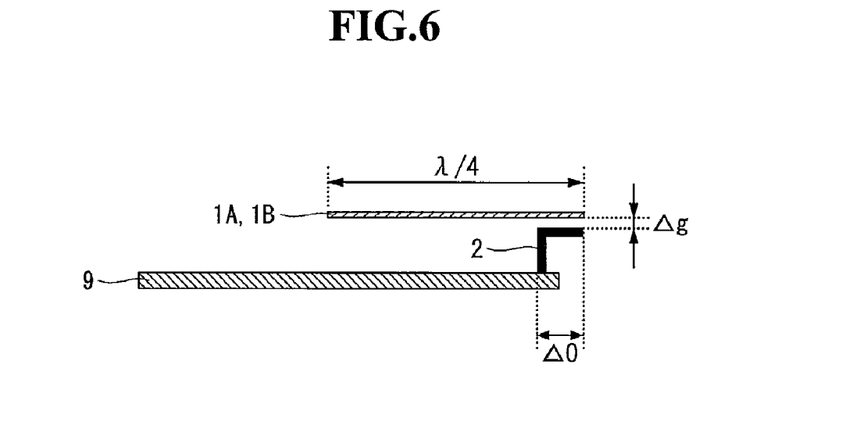
FIG. 6 is a vertical sectional view showing a coupling element and an antenna of a bar type mobile terminal according to an embodiment of the present disclosure.

The antenna 2 includes a terminal (Feed) feeding with an RF (Radio Frequency) signal from the mobile communication module 41, a terminal connected with a base voltage source (GND), and an RF discharging unit connected with the terminals and transmitting an RF signal. The RF discharging unit is bent one or more times in order to reduce a space occupied by the antenna 2. One side and/or the other side of the antenna 2 overlaps with the coupling elements 1A and 1B by a certain width ($\Delta 0$). The antenna 2 is disposed at a lower end of the second body 20 of the mobile terminal so as to be separated and away from the user's ear. In the slide type mobile terminal, as shown in FIG. 5, the antenna 2 is disposed at the lower end of the second body 20 and connected with the main PCB 3. In a bar type mobile terminal, all the elements as shown in FIG. 3 are disposed in one body, and the PCB as shown in FIG. 6 is installed in the body. Accordingly, in the bar type mobile terminal, as shown in FIG. 6, the antenna 2 is connected with a main PCB 9 which is not electrically connected with the slide PCB, and disposed at a lower end of the body where the main PCB 9 is installed.

The coupling elements 1A and 1B are non-fed conductive floating patterns which are not connected to any power and formed at the external case of the power supply unit 27 or at the rear case 22. The coupling elements 1A and 1B have a length of about $\lambda/4$. Here, $\lambda$ is one wavelength of electromagnetic waves transmitted at a transmission band frequency. Experimentation results reveal that an optimum current distribution effect (to be described) is obtained when the lengths of the coupling elements 1A and 1B are $\lambda/4$.

The coupling elements 1A and 1B overlap with one edge and/or the other edge of the antenna 2 with an dielectric interposed therebetween to form coupling with the antenna 2. According to the coupling, an induction current flows across the coupling elements 1A and 1B and a weak electric field is formed between the coupling elements 1A and 1B and the antenna 2. The electric field formed between the coupling elements 1A and 1B and the antenna 2 forms a closed loop with a main PCB 3 to reduce the amount of current flowing to the slide PCB 5 via the main PCB 3 and an FPCB 4 to thus weaken an electric field formed at an end of the slide PCB 5. Accordingly, the coupling between the coupling elements 1A and 1B and the antenna 2 can distribute the current flowing from the main PCB 3 and thus reduce the strength of electromagnetic waves formed at an upper end of the body of the mobile terminal which is close to the user's ear.

An electric field formed at the side of the audio output units 14 and 31 close to the user's ear can be weakened by using the coupling between the coupling elements 1A and 1B and the antenna 2, to thus minimize electromagnetic waves of the mobile terminal that may affect an electronic hearing aid. Thus, the mobile terminal can satisfy the regulations such as hearing aid compatibility (HAC), a specific absorption rate (SAR), or the like. In addition, because the coupling elements 1A and 1B are disposed to overlap with one and the other edges of the antenna 2, avoiding a main RF discharge part discharging an RF radiation pattern at the antenna 2, and the distances among the coupling elements 1A and 1B, the antenna 2, and the battery of the power supply unit 27 are optimally designed to satisfy the below conditions to thereby restrain a change in the antenna characteristics, the antenna characteristics-related references or bases of the mobile terminal such as total isotropic sensitivity (TIS), total radiated power (TRP), or the like, can be satisfied.

If the gap ($\Delta g$) between the coupling elements 1A and 1B and the antenna 2 is too small, the coupling elements 1A and 1B would be operated as antennas to change the antenna characteristics. If the gap ($\Delta g$) between the coupling elements 1A and 1B and the antenna 2 is too large, coupling would be too reduced to obtain the HAC reduction effect. Thus, the gap ($\Delta g$) between the coupling elements 1A and 1B and the antenna 2 is preferably within the range of 0.5 mm to 2 mm.

The antenna 2, the coupling elements 1A and 1B, and the battery of the power supply unit 27 are disposed at the lower end of the body of the mobile terminal. Accordingly, if the gap between the coupling elements 1A and 1B and the battery is too small, coupling would be formed therebetween, possibly causing the antenna characteristics to be changed. Thus, the coupling elements 1A and 1B and the battery should not overlap with each other and the gap between them should be at least 0.5 mm or larger. When the size of the mobile terminal and the disposition space of the antenna 2, the coupling elements 1A and 1B, the battery of the power supply unit 27, and the like, are considered, the coupling elements 1A and 1B and the battery of the power supply unit 27 should be spaced apart by the interval within the range of 0.5 mm to 2 mm.

Figure 7A:
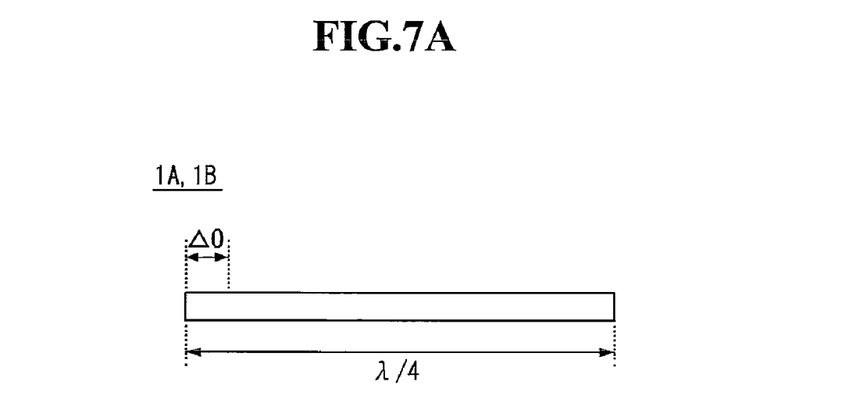
FIGS. 7A to 7C are views showing various modifications of the coupling elements shown in FIGS. 5 and 6.
Figure 7B:
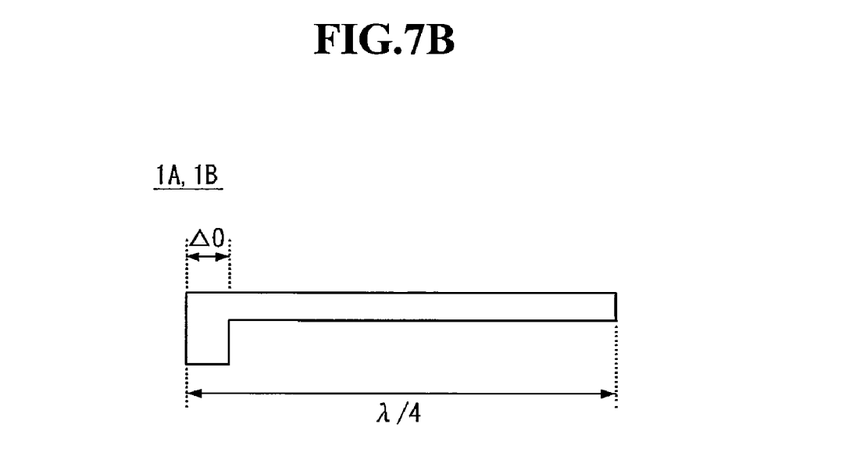
Figure 7C:
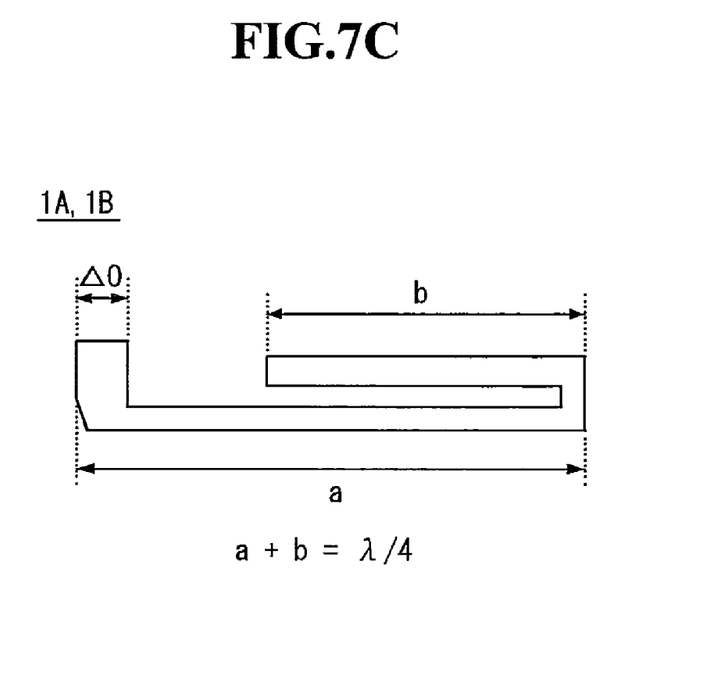

As shown in FIGS. 7A to 7C, the coupling elements 1A and 1B may be patterned in various forms. That is, the coupling elements 1A and 1B may be formed in the form of a straight line or may be bent one or more times. The portions of the coupling elements 1A and 1B overlapping with the antenna 2 may have a thicker width than other portions as shown in FIGS. 7B and 7C. In other words, as shown in FIGS. 7A to 7C, the coupling elements 1A and 1B may have a longer side portion and a shorter side portion bent from the longer side portion, and in this case, the width of the shorter side portion overlapping with the antenna 2 may be thicker than the longer side portion.

Figure 8:
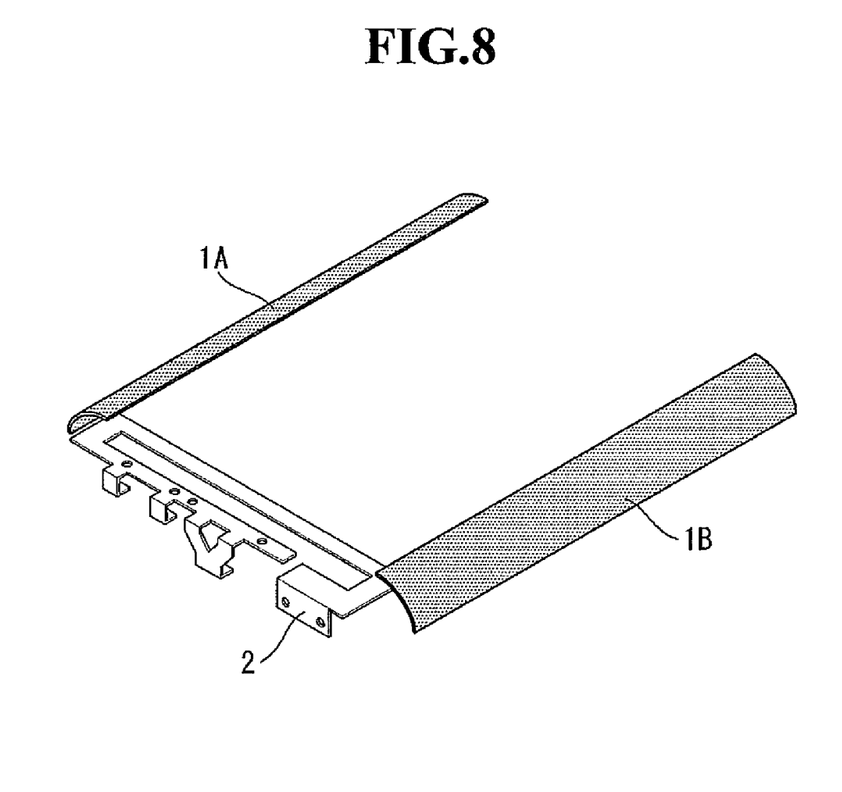
FIG. 8 is an exploded perspective view of the coupling element and the antenna of the slide type mobile terminal according to an embodiment of the present disclosure.
Figure 9:
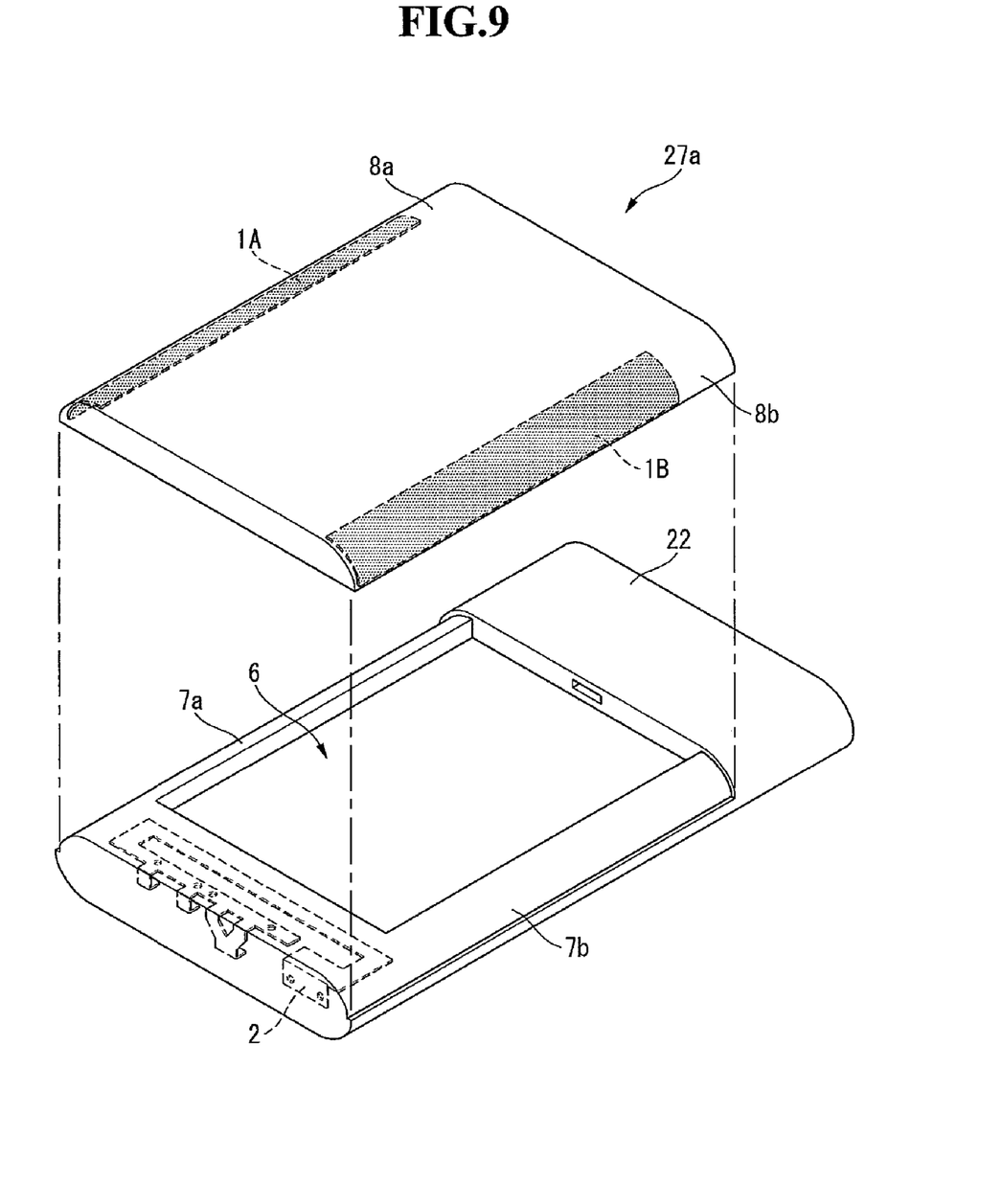
FIG. 9 is a rear exploded perspective view of the mobile terminal showing a battery protection cover, a coupling element and an antenna according to an embodiment of the present disclosure.

FIGS. 8 and 9 are exploded perspective views showing an example of the coupling elements 1A and 1B that can be actually applicable for the mobile terminal.

With reference to FIGS. 8 and 9, a battery receiving space 6 for receiving the battery of the power supply unit 27 is formed on the rear surface of the rear case 22. A power terminal connected with the main PCBs 3 and 9, an identification module socket, an external memory socket, or the like, may be disposed in the battery receiving space 6. A battery protection cover 27a of the power supply unit 27 may be detachably combined with the rear case 22 to open and close the battery receiving space 6. The battery, an identification module, an external memory, or the like, may be mounted in the battery receiving space 6 provided between the rear case 22 and the battery protection cover 27a. Side wall ribs 7a and 7b are formed to be protruded from left and right edges of the battery receiving space 6 to define the left and right sides of the battery receiving space 6 at the rear case 22. The battery protection cover 27a includes side walls 8a and 8b facing the side wall ribs 7a and 7b of the rear case 22. The side walls 8a and 8b are bent toward the side wall ribs 7a and 7b of the rear case 22 from both sides of a plane base part of the battery protection cover 27a.

A metal is attached on or a conductive polymer is coated on the surfaces of the side wall ribs 7a and 7b of the rear case 22 or on the surfaces of the side walls 8a and 8b of the battery protection cover 27a to allow the coupling elements 1A and 1B to overlap with the antenna 2 and be separated from the battery. The coupling elements 1A and 1B may be insertedly positioned in the side wall ribs 7a and 7b of the rear case 22 or in the side walls 8a and 8b of the battery protection cover 27a.

Figure 10:
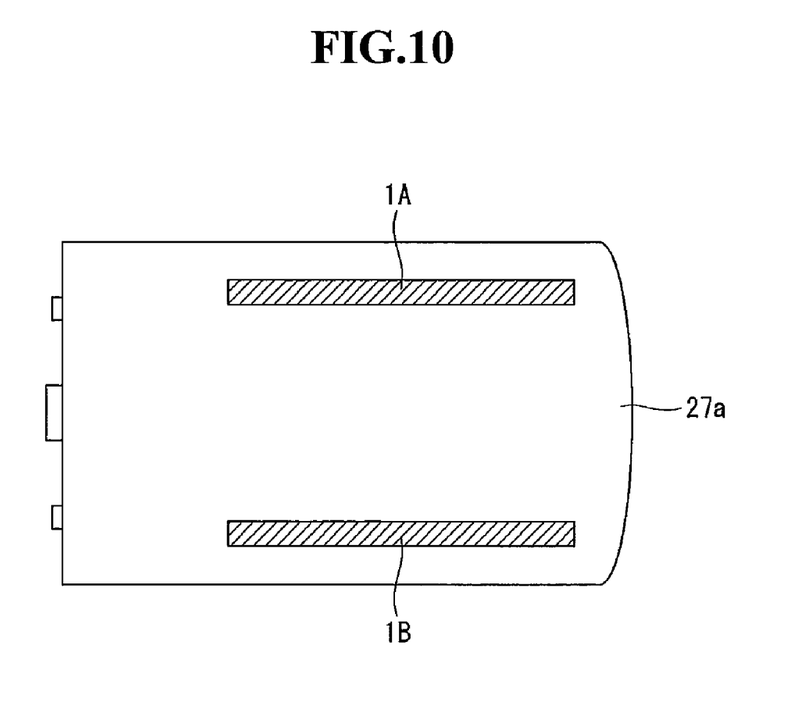
FIGS. 10 and 11 are views showing coupling elements 1A and 1B formed at the battery protection cover 27a of the mobile terminal.
Figure 11:
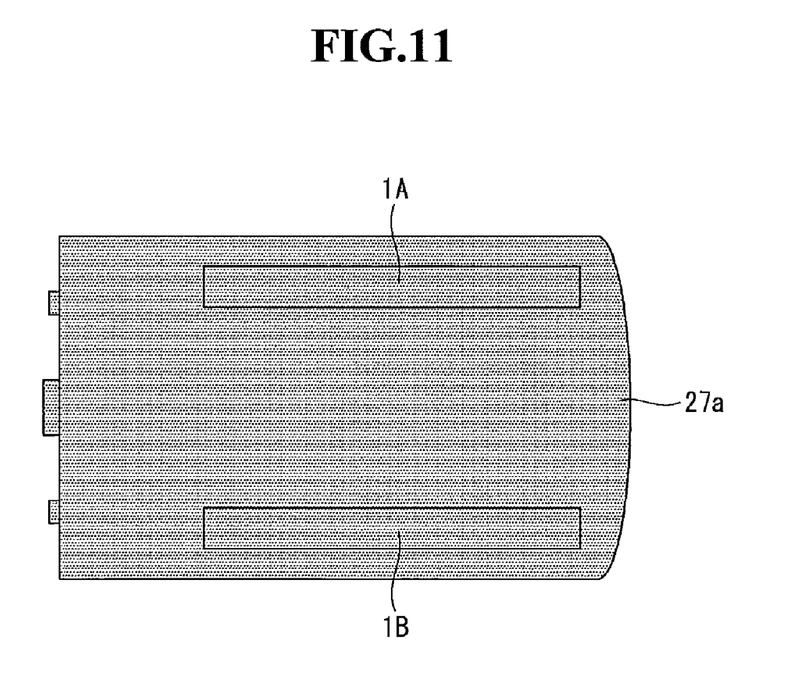

FIGS. 10 and 11 are views of the coupling elements formed at the battery protection cover 27a of the mobile terminal.

With reference to FIGS. 10 and 11, the coupling elements 1A and 1B may be formed on the edge portions of the surface of the battery protection cover 27a facing the battery receiving space. Also, the coupling elements 1A and 1B may be formed at both edges of the plane base part positioned near the side walls 8a and 8b of the battery protection cover 27a such that they do not overlap with the battery. A pigment may be coated on the coupling elements 1A and 1B in the same color as that of the battery protection cover 27a as shown in FIG. 11.

The above-described embodiments have been described based on the antenna 2 that transmits electromagnetic waves at the frequency of the mobile communication band, but the coupling elements may also overlap with one edge of the broadcast signal receiving antenna 32 to weaken the electromagnetic waves and current formed near the user's ear.

In the mobile terminal, because the non-fed conductive coupling elements are allowed to overlap with at least one of one edge and the other edge of the antenna, the electric field formed at the upper end of the mobile terminal close to the user's ear can be weakened. Consequently, the electromagnetic waves of the mobile terminal that makes a bad influence on the human body can be minimized without changing the antenna characteristics, and thus, the mobile terminal satisfying the HAC and the SAR can be implemented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal comprising:
    a front case and a rear case which are fastened with a printed circuit board (PCB) and an antenna connected with the PCB interposed therebetween;
    a battery protection cover opening and closing a battery receiving space provided on the rear case; and
    a conductive coupling element formed on one of the rear case and the battery protection cover such that the conductive coupling element is overlapped with at least one of one edge and the other edge of the antenna.

2. The mobile terminal of claim 1, wherein the gap between the antenna and the conductive coupling element is within the range of about 0.5 mm to 2 mm.

3. The mobile terminal of claim 1, further comprising:
    a battery mounted in the battery receiving space provided on the rear case, and the conductive coupling element and the battery do not overlap with each other.

4. The mobile terminal of claim 3, wherein the gap between the conductive coupling element and the battery is 0.5 mm or larger.

5. The mobile terminal of claim 1, wherein the conductive coupling element is formed on at least one of one edge and the other edge of the rear case.

6. The mobile terminal of claim 1, wherein the conductive coupling element is formed on at least one of one edge and the other edge of the battery protection cover.

7. The mobile terminal of claim 1, wherein the conductive coupling element is bent one or more times.

8. The mobile terminal of claim 7, wherein the conductive coupling element comprises a longer side portion and a shorter side portion bent from the longer side portion and overlapping with the antenna, and the width of the shorter side portion is thicker than the longer side portion.

9. The mobile terminal of claim 1, further comprising:
    a pigment coated on the conductive coupling element, and the pigment comprises a pigment of color similar to that of the battery cover.

10. The mobile terminal of claim 1, wherein the length of the conductive coupling element is substantially $\lambda/4$, wherein $\lambda$ is a wavelength of electromagnetic waves transmitted at a transmission band frequency of the mobile terminal.

11. A mobile terminal comprising:
    a first printed circuit board (PCB) installed in a first body;
    a second PCB connected with the first PCB via a flexible PCB (FPCB), and connected with an antenna, wherein the second PCB is installed in a second body;
    a battery protection cover opening and closing a battery receiving space provided on a rear case of the second body; and
    a conductive coupling element formed on one of the rear case and the battery protection cover such that the conductive coupling element is overlapped with at least one of one edge and the other edge of the antenna.

12. The mobile terminal of claim 11, wherein the gap between the antenna and the conductive coupling element is within the range of about 0.5 mm to 2 mm.

13. The mobile terminal of claim 11, further comprising:
    a battery mounted in the battery receiving space provided on the rear case, and the conductive coupling element and the battery do not overlap with each other.

14. The mobile terminal of claim 13, wherein the gap between the conductive coupling element and the battery is 0.5 mm or larger.

15. The mobile terminal of claim 11, wherein the conductive coupling element is formed on at least one of one edge and the other edge of the rear case.

16. The mobile terminal of claim 11, wherein the conductive coupling element is formed on at least one of one edge and the other edge of the battery protection cover.

17. The mobile terminal of claim 11, wherein the conductive coupling element is bent one or more times.

18. The mobile terminal of claim 17, wherein the conductive coupling element comprises a longer side portion and a shorter side portion bent from the longer side portion and overlapping with the antenna, and the width of the shorter side portion is thicker than the longer side portion.

19. The mobile terminal of claim 11, further comprising:
a pigment coated on the conductive coupling element, and the pigment comprises a pigment of color similar to that of the battery cover.

20. The mobile terminal of claim 11, wherein the length of the conductive coupling element is substantially $\lambda/4$, wherein $\lambda$ is a wavelength of electromagnetic waves transmitted at a transmission band frequency of the mobile terminal.

* * * * *